(12) United States Patent
Agrawal

(10) Patent No.: US 11,909,562 B2
(45) Date of Patent: Feb. 20, 2024

(54) CHANNEL TRAINING ADAPTATION

(71) Applicant: MAXLINEAR, INC, Carlsbad, CA (US)

(72) Inventor: Abhishek Kumar Agrawal, Fremont, CA (US)

(73) Assignee: MaxLinear, Inc., Carlsbad, CA (US)

( * ) Notice: Subject to any disclaimer, the term of this patent is extended or adjusted under 35 U.S.C. 154(b) by 167 days.

(21) Appl. No.: 16/834,946

(22) Filed: Mar. 30, 2020

(65) Prior Publication Data
US 2021/0306181 A1 Sep. 30, 2021

(51) Int. Cl.
*H04L 25/02* (2006.01)
*H04W 84/12* (2009.01)
*H04B 7/06* (2006.01)
*H04W 74/00* (2009.01)

(52) U.S. Cl.
CPC ......... *H04L 25/024* (2013.01); *H04B 7/0617* (2013.01); *H04L 25/0204* (2013.01); *H04W 74/006* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2003/0072382 A1* | 4/2003 | Raleigh | ................ | H04B 7/0626 375/267 |
| 2005/0141459 A1* | 6/2005 | Li | ....................... | H04L 25/0204 370/334 |
| 2005/0152473 A1* | 7/2005 | Maltsev | .................. | H04L 27/26 375/267 |
| 2007/0076811 A1* | 4/2007 | Aldana | ............... | H04L 25/0204 375/267 |
| 2007/0248174 A1* | 10/2007 | Ghosh | ................. | H04L 27/2626 375/E1.033 |
| 2010/0164802 A1* | 7/2010 | Li | .......................... | H01Q 1/246 342/368 |
| 2011/0002371 A1* | 1/2011 | Forenza | ............... | H04B 17/309 375/227 |
| 2011/0002410 A1* | 1/2011 | Forenza | ............... | H04B 7/0617 375/267 |

(Continued)

FOREIGN PATENT DOCUMENTS

WO 2016106753 A1 7/2016

*Primary Examiner* — Clemence S Han
(74) *Attorney, Agent, or Firm* — Buchalter; Jason W. Croft

(57) ABSTRACT

A method may include detecting parameter(s) of communication between an AP and a STA. The method may include determining a training configuration for a channel estimation of the communication based on the parameter(s). The method may include transmitting a DL transmission or a trigger frame to the STA. The DL transmission may include a training block configured according to the training configuration. The trigger frame may include the training configuration and instructions for the STA to include a training block configured according to the training configuration in a UL transmission to the AP. The STA may be configured to determine the channel estimation of a channel of the communication using the training block of the DL transmission received at the STA. Alternatively, the method may also include determining the channel estimation of a channel of the communication using the training block of the UL transmission received at the AP.

18 Claims, 4 Drawing Sheets

(56) References Cited

U.S. PATENT DOCUMENTS

| | | | |
|---|---|---|---|
| 2011/0002411 A1* | 1/2011 | Forenza | H04L 25/03343 375/267 |
| 2011/0003606 A1* | 1/2011 | Forenza | H04L 25/03343 455/501 |
| 2012/0257683 A1* | 10/2012 | Schwager | H04L 27/367 375/257 |
| 2013/0243062 A1* | 9/2013 | Raju | H04L 27/2647 375/226 |
| 2014/0204890 A1* | 7/2014 | Kudo | H04L 25/0226 370/329 |
| 2015/0139089 A1* | 5/2015 | Azizi | H04L 27/2613 370/329 |
| 2016/0066324 A1* | 3/2016 | Li | H04L 69/22 370/338 |
| 2017/0099089 A1* | 4/2017 | Liu | H04B 7/028 |
| 2017/0134076 A1* | 5/2017 | Maamari | H04B 7/0617 |
| 2017/0317727 A1* | 11/2017 | Wang | H04B 7/0452 |
| 2018/0006696 A1* | 1/2018 | Yue | H04B 7/0452 |
| 2018/0176066 A1* | 6/2018 | Lim | H04L 1/08 |
| 2018/0227027 A1* | 8/2018 | Trainin | H04B 7/0695 |
| 2018/0234860 A1* | 8/2018 | Kasher | H04B 7/063 |
| 2018/0248603 A1* | 8/2018 | Kasher | H04B 7/063 |
| 2018/0367650 A1* | 12/2018 | Motozuka | H04W 28/06 |
| 2019/0068258 A1* | 2/2019 | Oteri | H04B 7/043 |
| 2019/0075595 A1* | 3/2019 | Xue | H04L 1/0026 |
| 2019/0123798 A1* | 4/2019 | Lou | H04B 7/0695 |
| 2019/0254113 A1* | 8/2019 | Berger | H04W 72/23 |
| 2019/0260446 A1* | 8/2019 | Oteri | H04B 7/0695 |
| 2019/0281597 A1* | 9/2019 | Ramasamy | H04B 7/0695 |
| 2019/0356368 A1* | 11/2019 | Liu | H04L 5/0048 |
| 2019/0386726 A1* | 12/2019 | Fresia | H04B 7/0695 |
| 2020/0007222 A1* | 1/2020 | Ruder | H04B 7/0837 |
| 2021/0028839 A1* | 1/2021 | Oteri | H04B 7/0617 |
| 2021/0211178 A1* | 7/2021 | Moon | H04B 7/0617 |

* cited by examiner

CHANNEL TRAINING ADAPTATION

FIELD

The implementations discussed in the present disclosure are related to channel training adaptation.

BACKGROUND

Unless otherwise indicated in the present disclosure, the materials described in the present disclosure are not prior art to the claims in the present application and are not admitted to be prior art by inclusion in this section.

A wireless network (e.g., a wireless local area network (WLAN)) may include an access point (AP) and at least one wireless station (STA) that communicate with each other via one or more channels. The communication between the AP and the STA may include a training block for performing channel estimation. In some implementations, the channel estimation may be performed for a current channel. For example, a transmission from the AP to the STA on a particular channel may include the training block for the STA to use to perform channel estimation for the particular channel. The channel estimation may be used by the AP or the STA to decode data that is also included in the transmission.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an implementation, a method may include detecting one or more parameters of communication between an AP and a STA. The method may include determining a training configuration for a channel estimation of the communication based on the one or more parameters of the communication. The method may include transmitting a downlink (DL) transmission to the STA. The DL transmission may include a training block configured according to the training configuration. The STA may be configured to determine the channel estimation of a channel of the communication using the training block of the DL transmission received at the STA.

In another implementation, a system may include an AP. The AP may be configured to detect one or more parameters of communication between the AP and a STA. The AP may be configured to determine a training configuration for a channel estimation of the communication based on the one or more parameters of the communication. The AP may be configured to transmit a DL transmission to the STA. The DL transmission may include a training block configured according to the training configuration. The STA may be configured to determine the channel estimation of a channel of the communication using the training block of the DL transmission received at the STA.

In another implementation, a method may include detecting one or more parameters of communication between an AP and a STA. The method may include determining a training configuration for a channel estimation of the communication based on the one or more parameters of the communication. The method may include transmitting a trigger frame to the STA. The trigger frame may include the training configuration and instructions for the STA to include a training block configured according to the training configuration in an uplink (UL) transmission to the AP. The method may include determining the channel estimation of a channel of the communication using the training block of the UL transmission received at the AP.

In another implementation, a system may include an AP. The AP may be configured to detect one or more parameters of communication between the AP and a STA. The AP may be configured to determine a training configuration for a channel estimation of the communication based on the one or more parameters of the communication. The AP may be configured to transmit a trigger frame to the STA. The trigger frame may include the training configuration and instructions for the STA to include a training block configured according to the training configuration in a UL transmission to the AP. The AP may be configured to determine the channel estimation of a channel of the communication using the training block of the UL transmission received at the AP.

BRIEF DESCRIPTION OF THE DRAWINGS

Example implementations will be described and explained with additional specificity and detail through the use of the accompanying drawings in which.

DETAILED DESCRIPTION

Figure 1:
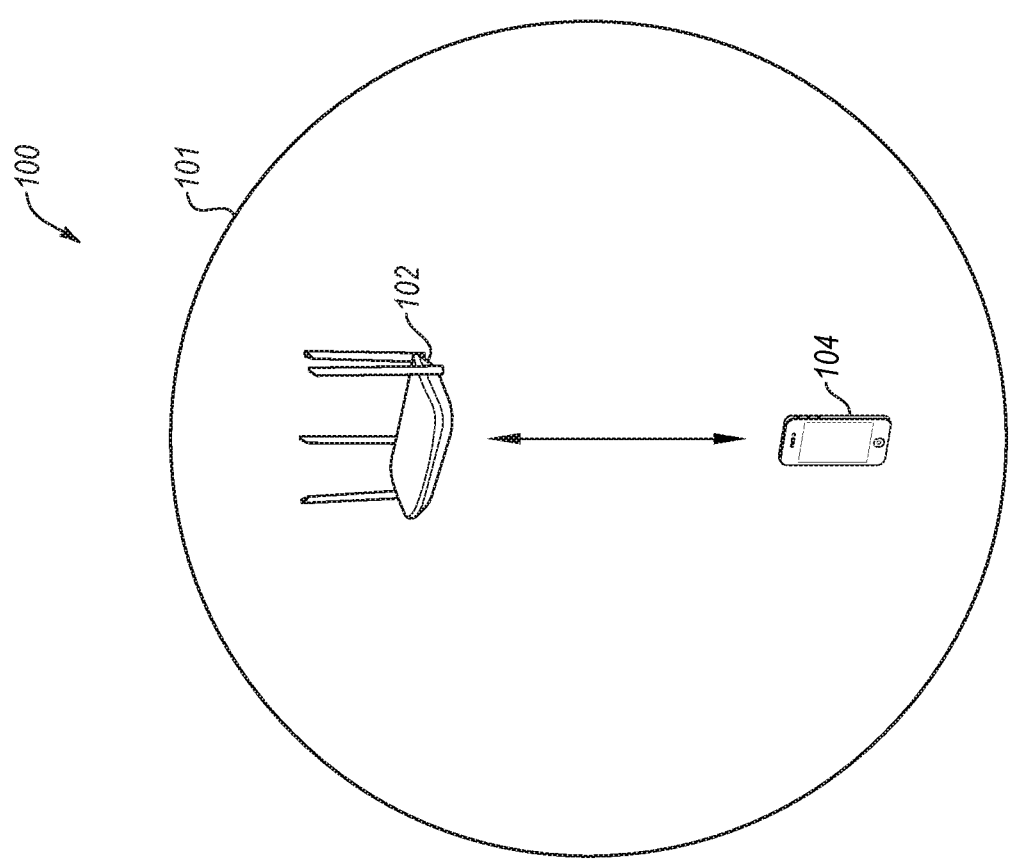
FIG. 1 illustrates an example environment in which an AP may be implemented.

A wireless network (e.g., a WLAN) may include an AP and at least one STA that communicate with each other via one or more channels. In some implementations, the AP and the STA may communicate according to a high efficiency (HE) long training field (LTF) format. For example, the AP and the STA may communicate according to a HE single user (SU) format, a HE extended range SU format, a HE trigger based (TB) format (e.g., a STA to an AP transmission), or a HE multi-user (MU) format (e.g., an AP to a STA transmission). In some implementations, the transmissions may be transmitted via an uplink (UL) or a DL within the wireless network. The UL may include a link from the STA to the AP and the DL may include a link from the AP to the STA. In some implementations, the UL may occur on a reverse channel and the DL may occur on a forward channel in the wireless network. In some implementations, each transmission of the communication between the AP and the STA may include a preamble (e.g., a legacy preamble), a HE preamble, and a data portion.

In some implementations, the HE preamble may include a training block that includes training symbols. The training symbols may be used by the AP or the STA, as receivers, to determine a channel estimation of a current channel (e.g., the forward channel or the reverse channel) of the communication. In some implementations, the AP or the STA may determine characteristics of the channel using the training symbols. In addition, the channel estimation may be used by the AP or the STA to decode the data portion of the transmission. In some implementations, an accuracy of the channel estimation may impact a signal to noise ratio (SNR) or a bit error rate (BER) of the communication. For example, if the accuracy of the channel estimation is low, the SNR may be low or the BER may be high and some of the data portion may be incorrectly decoded. In some implementations, the accuracy of the channel estimation may impact link throughput of the communication on the channel.

In some channel training technologies, a number or a length of the training symbols in the training block may be constant. In addition, in some channel training technologies, the AP or the STA may notify the receiver if pre-coding is being applied to the transmission. Further, in some channel training technologies, one or more of the training symbols may be transmitted in unallocated resource blocks of the data portion of the transmission. These channel training technologies may not permit the number or the length of the training symbols to be adjusted (e.g., adapted) to improve performance of the communication between the AP and the STA.

In addition, these channel training technologies may cause an overhead of the training block to be constant even when it may be possible for the channel estimation to be determined using a training block with a smaller overhead. In addition, these channel training technologies may cause the SNR to be low or the BER of the transmission to be high even when it may be possible for the channel estimation to be improved by adjusting the number or length of the training symbols in the training block. Further, these channel training technologies may reduce the throughput of or increase processing to perform the communication between the AP and the STA.

Some implementations described in the present disclosure may permit the training block to be adjusted based on parameters of the communication between the AP and the STA. According to implementations described in the present disclosure, the training block may be adjusted by adjusting the number or the length of the training symbols in the training block.

In at least one implementation described in the present disclosure, the AP may detect the parameters of the communication between the AP and the STA. In these and other implementations, the AP may determine a training configuration for the channel estimation of the communication based on the parameters of the communication. In some implementations, the training configuration may indicate that the number or length of training symbols is to be adjusted relative to a previous transmission between the AP and the STA.

In these and other embodiments, the AP may transmit a DL transmission or a trigger frame to the STA. The DL transmission, when transmitted, may include a training block configured according to the training configuration. The trigger frame, when transmitted, may include the training configuration and instructions for the STA to include a training block configured according to the training configuration in a UL transmission to the AP. The training block of the DL transmission or the UL transmission may include adjusted symbols (e.g., a training block with a different number of symbols and/or symbols of different lengths than previously) according to the training configuration. Thus, the AP may determine training configurations for the DL or the UL. In some implementations, the AP may determine the channel estimation based on the training block in the UL transmission. In other implementations, the STA may determine the channel estimation based on the training block in the DL transmission.

Accordingly, at least one implementation described in the present disclosure may improve throughput of the communication between the AP and the STA. For example, the training configuration may indicate the length of the training symbols is to be reduced, which may cause the overhead of the training block to be reduced. In addition, at least one implementation described in the present disclosure may improve a data rate for the communication between the AP and the STA by increasing the SNR or reducing the BER. For example, the training configuration may indicate the number of training symbols is to be increased to improve an averaging of a noise of the training symbols to reduce the noise of the transmission and thereby increase the SNR.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example environment 100 in which an AP 102 may be implemented. The environment 100 may also include a STA 104. The AP 102 and the STA 104 may form a wireless network 101. The circle representative of the wireless network 101 as illustrated in FIG. 1 is provided for reference and may but does not necessarily represent actual coverage areas of the wireless network 101.

In some implementations, the AP 102 may provide access to the Internet for the STA 104. Examples of the STA 104 may include personal computers, printers, televisions, digital video disc (DVD) players, security cameras, smartphones, tablets, smart devices, or any other appropriate computing device configured for wireless communication. In these and other implementations, the AP 102 may implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax".

In some implementations, the AP 102 may detect parameters of communication between the AP 102 and the STA 104. In these and other implementations, the parameters of communication may include a channel frequency selectivity of the channel, a length of packets in or an airtime of the transmissions, precoding or beamforming of the transmissions, the SNR of the transmissions, or success rates of previous transmissions between the AP 102 and the STA 104. In addition, the AP 102 may determine a training configuration based on the parameters of the communication. The training configuration may be determined to be used for channel estimation of the communication between the AP 102 and the STA 104.

In some implementations, the training configuration may indicate the length of the training symbols in the training block. For example, the training configuration may indicate that the length of the training symbols is to be 3.2 microseconds (μs) (e.g., a 1×length or a regular length), 6.4 μs (e.g., a 2×length), or 12.8 μs (e.g., a 4×length). In these and other implementations, the training configuration may indicate the length of the training symbols is to be adjusted relative to a previous transmission between the AP 102 and the STA 104. In some implementations, setting or adjusting the length of the training symbols to 3.2 µs may reduce an airtime overhead of the training block. In other implementations, setting or adjusting the length of the training symbols to 12.8 µs may improve performance of the channel estimation for a frequency selective channel.

In some implementations, the training configuration may indicate the number of the training symbols to be included in the training block. For example, the training configuration may indicate that the number of training symbols to be included in the training block is to be two, four, six, or eight, which may be more, less, or the same number of training symbols included in the previous transmission. In these and other implementations, each training symbol may contribute to an overall length (e.g., the airtime) of the training block where the overall length may be equal to the number of training symbols times the length per symbol. The overall length may be more, less, or the same as in the previous transmission. For example, if the number of training symbols is increased from two to four and the length of the training symbols remains at 6.4 µs, the overall length of the training block may increase from 12.8 µs to 25.6 µs.

In some implementations, the AP 102 may generate the training block to include the determined number and the determined length of the training symbols in the DL transmission from the AP 102 to the STA 104 according to, e.g., as specified by, the training configuration. In other implementations, the AP 102 may generate a trigger frame that includes instructions to the STA 104 to include the training block with the determined number and the determined length of the training symbols (e.g., the training configuration) in the UL transmission from the STA 104 to the AP 102.

In some implementations, the AP 102 may transmit the DL transmission to the STA 104. In these and other implementations, the DL transmission may include a training block configured according to the training configuration. For example, the number and/or length of training symbols in the training block may be specified in the training configuration. Accordingly, the training block in the DL transmission may be generated according to the training configuration.

In other implementations, the training configuration may be included with the instructions to the STA 104 in the trigger frame. In this and other implementations, the STA 104 may generate the training block for the UL transmission according to the training configuration received in the trigger frame.

In some implementations where the DL transmission includes the generated training block, the AP 102 may transmit the DL transmission with the training block and a data portion (e.g., payload) to the STA 104. The STA 104 may perform channel estimation of the channel of the communication based on the training block in the DL transmission. In addition, the STA 104 may decode the data portion of the DL transmission based on the channel estimation.

In some implementations, the AP 102 instead sends a TB transmission (e.g., a transmission to trigger a response transmission from the STA 104) or other trigger frame to the STA 104. In these and other implementations, the trigger frame may include the training configuration and instructions to the STA 104 to include a training block configured according to the training configuration in one or more UL transmissions to the AP. In addition, the STA 104 may generate the training block for the UL transmission according to the training configuration in the trigger frame received from the AP 102. The STA 104 may transmit the UL transmission with the training block and a data portion to the AP 102. The AP 102 may perform channel estimation of the channel of the communication based on the training block in the UL transmission. In addition, the AP 102 may decode the data portion of the UL transmission based on the channel estimation.

The parameters of the communication including the channel frequency selectivity of the channel will now be discussed. In some implementations, the AP 102 may determine the channel of the communication with the STA 104 is a flat fading channel. In these and other implementations, the AP 102 may determine the channel is a flat fading channel by determining whether a coherence bandwidth of the channel is larger than a bandwidth of a corresponding transmission. In some implementations, the flat fading channel may cause the AP 102 or the STA 104 to be more susceptible to interference caused by transmissions on neighboring channels.

If the channel is flat fading, the training configuration may be determined to reduce the length of the training symbols in the training block, e.g., compared to the length of the training symbols in training blocks sent in previous transmissions. In many of the examples that follow, only one example paired input parameter (e.g., parameter of the communication) and output parameter (e.g., training configuration adjustment) are discussed. Where an opposite input parameter is determined by the AP 102, the training configuration may be determined to have an output parameter that moves in an opposite direction. For example, if the channel is determined to be frequency selective rather than flat fading, the training configuration may be determined to increase rather than reduce the length of the training symbols in the training block.

In some implementations, reducing the length of the training symbols compared to the length in previous transmissions may improve performance of the channel estimation for the flat fading channel. For example, the training configuration may be determined to reduce the length of the training symbols to 3.2 µs or 6.4 µs. In some implementations, the AP 102 may generate the DL transmission to include the training block according to the training configuration and specifically to include the training block with the training symbols with the reduced length. Alternatively, in some implementations, the AP 102 may generate a trigger frame that includes the training configuration with instructions to the STA 104 to include a training block according to the training configuration, e.g., with the training symbols with the reduced length, in the UL transmission.

The parameters of the communication including the length of packets in the data portion of transmissions between the AP 102 and the STA 104 will now be discussed. In some implementations, the AP 102 may detect the length of packets in the data portion of transmissions between the AP 102 and the STA 104. In these and other implementations, the length of the packets in the data portion may be determined for packets that were previously transmitted between the AP 102 and the STA 104, e.g., in previous DL or UL transmissions. For example, the AP 102 may detect the length of packets in the data portion previously received in one or more previous UL transmissions from the STA 104 or previously sent in one or more previous DL transmissions. In other implementations, the length of the packets in the data portion may be determined for packets that are to be transmitted in the data portion of the DL transmission with the training block configured according to the training configuration or in the UL transmission with the training block configured according to the training configuration. For example, the AP 102 may detect the length of packets in the data portion of the DL transmission.

In some implementations, if the length of the data portion in the packet is less than a packet length threshold value, the training configuration may be determined to reduce the length of the training symbols in the training block. Additionally or alternatively, if the length of the data portion in the packet is less than the packet length threshold value, the training configuration may be determined to reduce the number of the training symbols in the training block. In an example implementation, the packet length threshold may be 90% of the total packet length. For example, suppose the packet length is 300 microseconds, in which case the packet length threshold may be 270 microseconds in this example. If the training block includes a total length of 102.4 microseconds (e.g., 8 training symbols times 12.8 microseconds per symbol) then the length of the data portion in the packet may be 197.6 microseconds which is less than the 270 microsecond packet length threshold. Accordingly, the training configuration may be determined to reduce the length of the training block in this example, e.g., by reducing the length of each training symbol and/or by reducing the total number of training symbols in the training block. On the other hand, if the training block includes a total length of 12.8 microseconds (e.g., 4 training symbols times 3.2 microseconds per symbol) then the length of the data portion in the packet may be 287.2 microseconds which is greater than the 270 microsecond packet length threshold. Accordingly, the training configuration may be determined to maintain the length of the training block as is in this example or even to increase the length of the training block, e.g., by increasing the length of each training symbol and/or by increasing the total number of training symbols in the training block.

In some implementations, the training configuration may be determined to reduce the number or the length of the training symbols in the training block. Reducing the number or length of the training symbols may reduce the airtime of the training block or the total airtime of the DL transmission or the UL transmission. In these and other implementations, the AP 102 may generate the DL transmission to include the training block according to the training configuration, e.g., where the training block has the reduced number of training symbols and/or the training symbols with the reduced length. Alternatively, in some implementations, the AP 102 may generate the trigger frame to include the training configuration with the instructions to the STA 104 to include in the UL transmission the training block according to the training configuration.

The parameters of the communication including the airtime of transmissions between the AP 102 and the STA 104 will now be discussed. In some implementations, the AP 102 may detect the airtime of previous or current transmissions between the AP 102 and the STA 104. In some implementations, the airtime may correspond to an amount of time that elapses for single transmissions between the AP 102 and the STA 104. For example, the AP 102 may determine an amount of time between initiation and receipt of the transmission using a time stamp. In other implementations, the airtime may correspond to TB transmissions plus response transmissions between the AP 102 and the STA 104. For example, the airtime may be equal to an amount of time that has elapsed between the AP 102 transmitting the TB transmission or other trigger frame and the AP 102 receiving the response transmission from the STA 104.

In some implementations, the AP 102 may determine a distance between the AP 102 and the STA 104 based on the airtime. In these and other implementations, if the distance is greater than a distance threshold value, the training configuration may be determined to increase the number of the training symbols in the training block. The distance threshold value may be close to an end of range of the AP 102 where the link with the STA 104 is so weak that increasing the number of training symbols may bring gains in channel estimation and further help decoding. As an example, the distance threshold value may be about 80%, 85%, 90%, or 95% of the end of range of the AP 102. The end of range of the AP 102 may be inferred based on received signal strength indicator (RSSI), rate control decided MCS, or other historical information for a link. Where RSSI is used as range indicator (e.g., end of range), the distance threshold value may be 6 decibels (dB) above a minimum supported RSSI. If MCS is used as the range indicator, a lower 1 or 2 MCS may be used as the distance threshold value with increased number of training samples.

In these and other implementations, the AP 102 may generate the DL transmission to include the training block according to the training configuration, e.g., with the increased number of training symbols. Alternatively, in some implementations, the AP 102 may provide the training configuration for UL transmissions from the STA or other STAs by including the training configuration in the trigger frame sent by the AP 102 on downlink. The STA 104 may use these parameters, e.g., the training configuration, to generate training blocks in uplink response packet generally referred to herein as UL transmissions.

The parameters of the communication including the pre-coding of transmissions between the AP 102 and the STA 104 will now be discussed. In some implementations, the AP 102 may detect pre-coding or beamform selection for the transmissions between the AP 102 and the STA 104. For example, the AP 102 may determine DL-MU pre-coding is to be used for the DL transmission in which case various receiver techniques may or may not be able to be used by the STA 104 to improve the channel estimation of the received DL transmission from the AP 102.

In some implementations, the training configuration may be determined to increase the number of the training symbols in the training block based on the pre-coding of the transmissions. In these and other implementations, increasing the number of the training symbols in the training block may reduce a noise of the DL transmission or the UL transmission by averaging a noise of each training symbol over the increased number of training symbols rather than over fewer training symbols as included in previous transmissions. In addition, in some implementations, the AP 102 may generate the DL transmission to include the training block according to the training configuration, e.g., with the increased number of training symbols. Alternatively, in some implementations, the AP 102 may generate the trigger frame to include the training configurations with the instructions to the STA 104 to include the increased number of training symbols in the training block of the UL transmission.

The parameters of the communication including the parameters of the previous transmissions between the AP 102 and the STA 104 will now be discussed. In some implementations, the AP 102 may detect the parameters of the previous transmissions between the AP 102 and the STA 104. The parameters may include the number or length of the training symbols in the training blocks of the previous transmissions. In these and other implementations, the AP 102 may determine a success rate of the previous transmissions using the different parameters. For example, the AP 102 may determine the success rate of transmissions between the AP 102 and the STA 104 that include two training symbols in the training blocks.

In some implementations, if the success rate of the previous transmissions is below a success threshold value, the training configuration may be determined to indicate the number or the length of the training symbols in the training block are to be adjusted. For example, if the success rate is below the success threshold value and the number of training symbols in a previous transmission was six with a length of 6.4 µs, the training configuration may be determined to indicate the length of the training symbols is to be increased to 12.8 µs and the number of the training symbols will remain six. As another example, if the success rate is below the success threshold value and the number of training symbols in a previous transmission was two with a length of 3.2 µs, the training configuration may be determined to indicate the length of the training symbols is to be increased to 6.4 µs and the number of training symbols is to be increased to four. The success rate may include a ratio of correctly decoded packets to total transmitted packets and the success threshold value may include a success rate of 90% or some other value.

Alternatively, embodiments described herein may consider failure rate (rather than success rate) such as packet error rate (PER) and a failure threshold value such as a PER of 10% or some other value. In this example, the length of the training symbols or the number of training symbols may be determined to be increased in the training configuration in response to the failure rate being greater than the failure threshold value.

In some implementations, the AP 102 may generate the DL transmission to include the training block according to the training configuration with the increased number of training symbols or the training symbols with the increased length. Alternatively, in some implementations, the AP 102 may generate the trigger frame to include the training configuration with the instructions to the STA 104 to include the increased number of training symbols or the training symbols with the increased length in the training block of the UL transmission.

The parameters of the communication including the SNR of previous transmissions between the AP 102 and the STA 104 will now be discussed. In some implementations, the AP 102 may detect the SNR of the UL or the DL between the AP 102 and the STA 104. In these and other implementations, if the SNR of the UL or the DL is less than a SNR threshold value, the training configuration may be determined to increase the number of the training symbols in the training block of the corresponding UL or DL transmission. The SNR threshold value may be 3 dB or some other value. In these and other implementations, the AP 102 may generate the DL transmission to include a training block according to the training configuration with the increased number of training symbols. Alternatively, in some implementations, the AP 102 may generate the trigger frame to include the training configuration with the instructions to the STA 104 to include the increased number of training symbols in the training block of the UL transmission.

In some implementations, the number of training symbols in the training block of the DL transmission or the UL transmission may always be equal to or greater than the number of streams (e.g., connections between the AP 102 and STAs within the wireless network 101). For example, the wireless network 101 may include a second STA and a third STA (not illustrated in FIG. 1) and the number of training symbols may always be equal to or greater than three. In addition, implementations described in the present disclosure may be implemented in a media access control (MAC) layer or a physical (PHY) layer of the AP 102. Further, the number or the length of the training symbols in the training block may be determined based on a combination of two or more of the examples described above. For example, the number or the length of the training symbols may be determined based on any combination of the channel frequency selectivity of the channel, the length of packets in the data portion of transmissions, the airtime of transmissions, the pre-coding of transmissions, and the parameters of the previous transmissions between the AP 102 and the STA 104.

Figure 2:
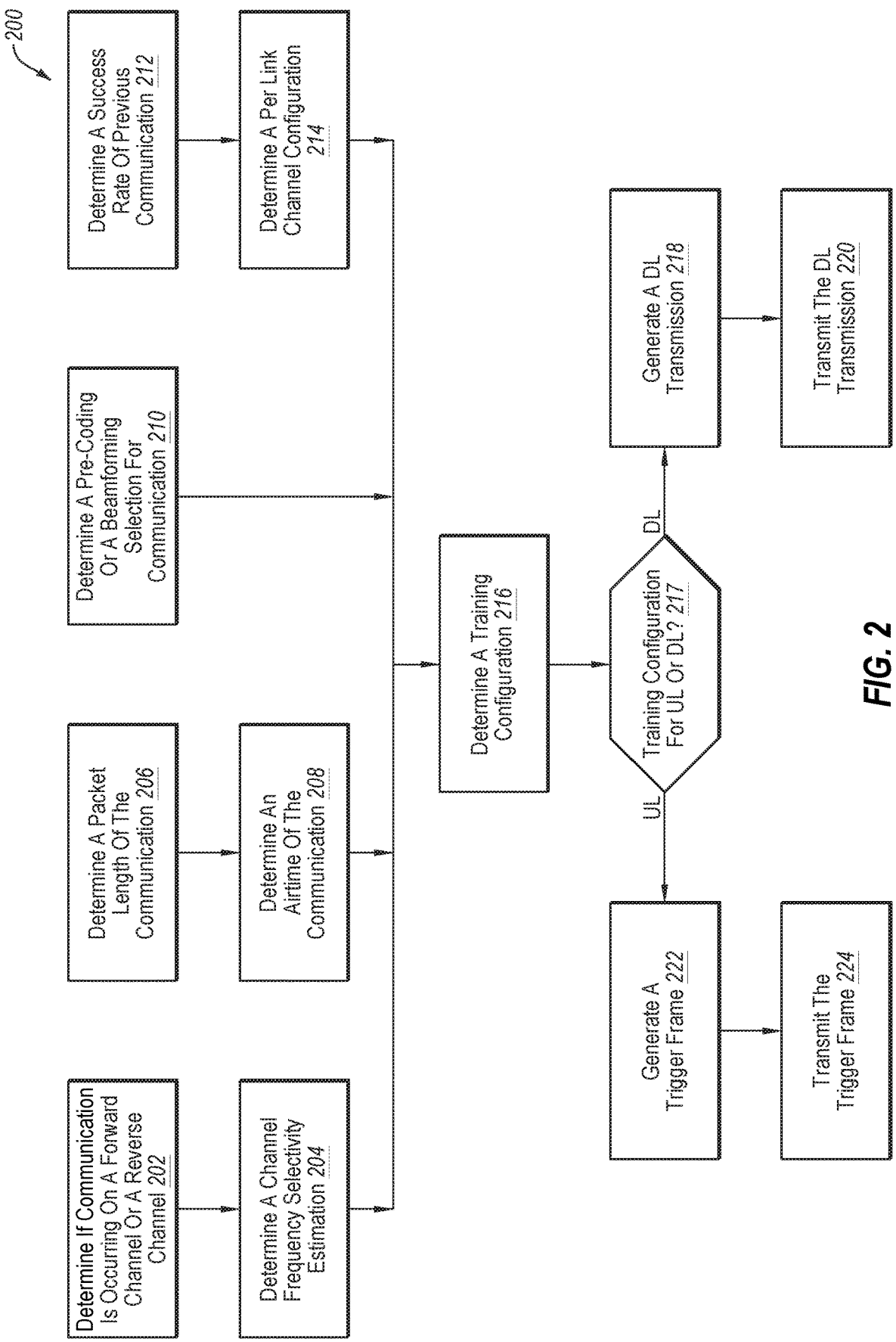
FIG. 2 illustrates a flowchart of an example method to perform channel training adaptation.

FIG. 2 illustrates a flowchart of an example method 200 to perform channel training adaptation. In some implementations, the method 200 may be performed by any suitable system, apparatus, or device with respect to channel training adaptation. For example, the AP 102 or the STA 104 of FIG. 1 may perform or direct performance of one or more of the operations associated with the method 200. The method 200 may include one or more blocks 202, 204, 206, 208, 210, 212, 214, 216, 218, or 220.

In general, the method 200 may include determining one or more parameters of communication between an AP and a STA, the determination of the one or more parameters of the communication including one or more of blocks 202, 204, 206, 208, 210, 212, 214. Each of blocks 202, 204, 206, 208, 210, 212, 214 is discussed in more detail below.

At block 202 it may be determined if communication is occurring on the forward channel or the reverse channel. In some implementations, the communication may be occurring on the forward channel if the AP 102 is transmitting data to the STA 104. In these and other implementations, the communication may be occurring on the reverse channel if the STA 104 is transmitting data to the AP 102. Additionally or alternatively, the channel of the communication may be determined based on information included in the transmission.

At block 204, a channel frequency selectivity estimation may be determined. In some implementations, the channel frequency selectivity estimation may be determined by the AP 102 as the channel frequency selectivity of the channel of the communication as discussed above in relation to FIG. 1. For example, the channel frequency selectivity estimation may be determined to indicate whether the channel is a flat fading channel or a channel with highly frequency selective fading.

At block 206, a packet length (e.g., a length of the packets) of the communication may be determined. In some implementations, the AP 102 may determine the packet length of the communication as discussed above in relation to FIG. 1. For example, the packet length may be determined based on packets included in data portions of the DL transmissions, the UL transmissions, or the previous transmission.

At block 208, an airtime of the communication may be determined. In some implementations, the AP 102 may determine the airtime of the communication as discussed above in relation to FIG. 1. For example, the airtime may be determined based on an amount of time that elapses between initiation and end of the transmission. As another example, the airtime may be determined using the packet length of the packets in the DL transmission or the UL transmission.

At block 210, a pre-coding or a beamforming selection for the communication may be determined. In some implementations, the AP 102 may determine the pre-coding or the beamforming selection as discussed above in relation to FIG. 1. The pre-coding or the beamforming selection for a transmission may limit techniques that may be used to perform channel estimation at the receiver.

At block 212, a success rate of previous communication(s) may be determined. In some implementations, the success rate may be determined based on previous transmission(s) between the AP 102 and the STA 104. In these and other implementations, the AP 102 may determine the success rate as discussed above in relation to FIG. 1.

At block 214, a per link channel configuration may be determined. In some implementations, the per link channel configuration may include the number or length of the training symbols in the training block of the previous communication. In these and other implementations, the AP 102 may determine the per link configuration as discussed above in relation to FIG. 1.

At block 216, a training configuration may be determined. In some implementations, the training configuration may be determined based on any combination of the channel frequency selectivity estimation, the airtime of the communication, the pre-coding or the beamforming selection, or the per link channel configuration and the success rate of the previous communication. In these and other implementations, the AP 102 may determine the training configuration as discussed above in relation to FIG. 1. In some implementations, the training configuration may be determined to indicate the number of training symbols to be included in the training block is to be one, two, four, six, or eight. In these and other implementations, the training configuration may be determined to indicate the length of the training symbols is to be equal to 1×, 2×, or 4×. The training configuration may be determined with or without reference to a previous transmission as a reference. For example, the training configuration may be determined to indicate that the number, length, or both number and length of training symbols is to be increased, decreased, or maintained relative to a prior training configuration. Alternatively, the determined training configuration may set the number, length, or both number and length of training symbols without reference to a prior training configuration.

At block 217, it may be determined whether the training configuration is for subsequent DL or UL transmissions. If the communication parameters determined at one or more of blocks 202, 204, 206, 208, 210, 212, 214 are for the forward channel, it may be determined at block 217 that the training configuration is for DL transmissions, in which case block 217 may be followed by one or more of blocks 218, 220. If the communication parameters determined at one or more of blocks 202, 204, 206, 208, 210, 212, 214 are for the reverse channel, it may be determined at block 217 that the training configuration is for UL transmissions, in which case block 217 may be followed by one or more of blocks 222, 224.

At block 218, and in response to determining at block 217 that the training configuration is for subsequent DL transmissions, a DL transmission may be generated. In some implementations, the DL transmission may be generated to include the training block according to the training configuration with the determined number or length of the training symbols.

At block 220, the DL transmission may be transmitted. In some implementations, the DL transmission may be transmitted to the STA 104 from the AP 102 and the STA 104 may perform channel estimation using the training block as discussed above in relation to FIG. 1.

At block 222, and in response to determining at block 217 that the training configuration is for subsequent UL transmissions, a trigger frame may be generated to include the training configuration with the instructions to the STA 104 to include the determined number or the determined length of training symbols in the training block of the UL transmission.

At block 224, the trigger frame may be transmitted to the STA 104. In response to receiving the trigger frame, the STA 104 may generate the UL transmission to include the training block according to the training configuration. The STA 104 may then transmit the UL transmission with the training block configured according to the training configuration to the AP 102. The AP 102 may receive the UL transmission and may perform channel estimation using the training block as discussed above in relation to FIG. 1.

One skilled in the art will appreciate that, for this and other processes, operations, and methods described in the present disclosure, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed implementations.

Figure 3:
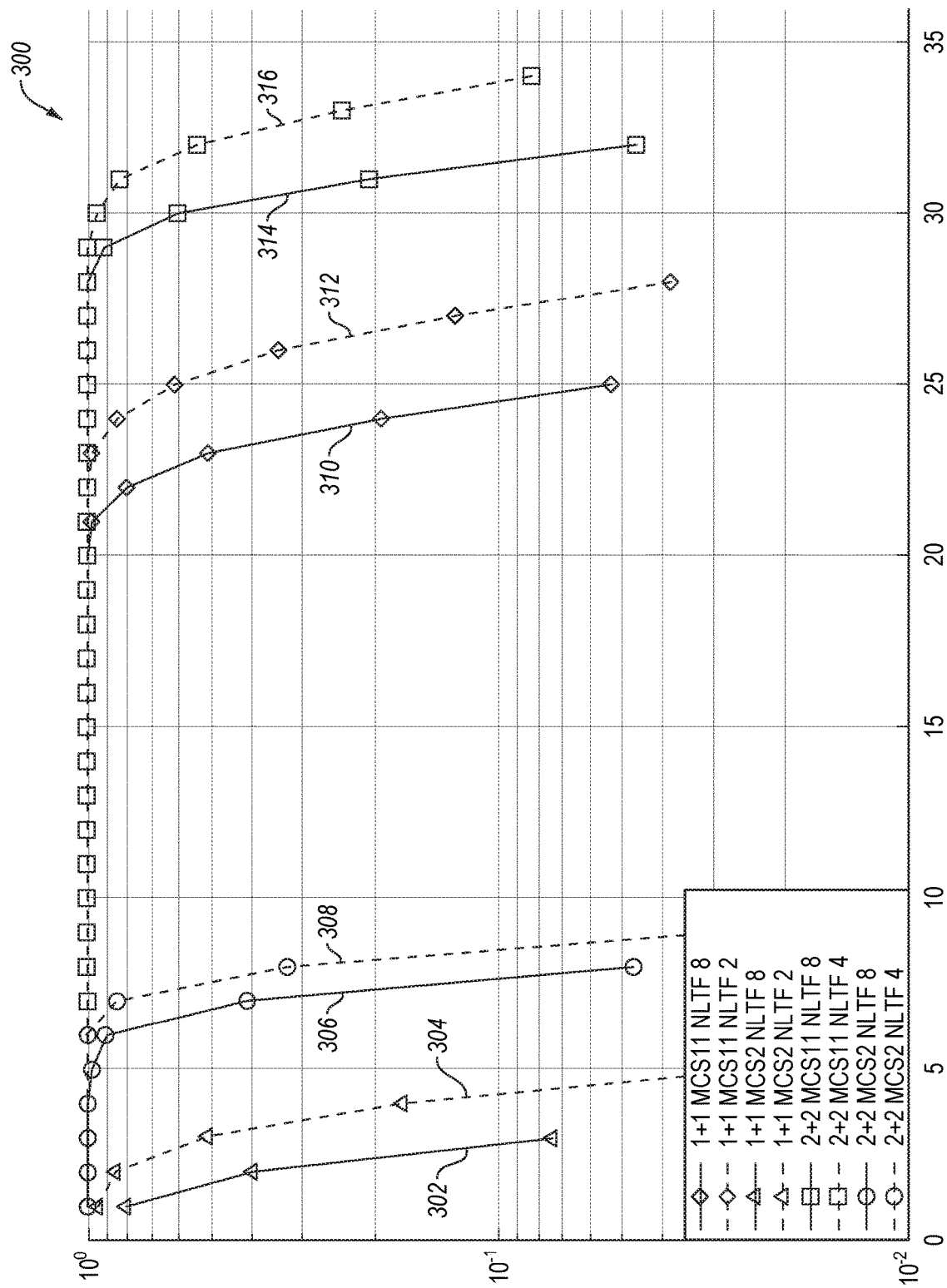
FIG. 3 illustrates a graphical representation of a simulation of the SNR versus a packet error rate of a DL between an AP and two STAs with either two streams or four streams of communication using various numbers of training symbols and modulation schemes.

FIG. 3 illustrates a graphical representation 300 of a simulation of the SNR versus a packet error rate (PER) of the DL between an AP and two STAs with either two streams or four streams of communication using various numbers of training symbols and modulation schemes. In the graphical representation 300, the Y axis indicates the PER according to a logarithmic scale and the X axis indicates the SNR. The simulation was performed using modulation and coding scheme (MCS) 2 (MCS2) and MCS11. In addition, the DL used for the simulation was channel D.

Curve 302 represents the simulated SNR versus PER for two streams of communication within the wireless network using MCS2 and eight training symbols (illustrated in FIG. 3 as NLTF 8). Curve 304 represents the simulated SNR versus PER for two streams of communication within the wireless network using MCS2 and two training symbols (illustrated in FIG. 3 as NLTF 2). Curve 306 represents the simulated SNR versus PER for four streams of communication within the wireless network using MCS2 and eight training symbols. Curve 308 represents the simulated SNR versus PER for four streams of communication within the wireless network using MCS2 and four training symbols (illustrated in FIG. 3 as NLTF 4).

Curve 310 represents the simulated SNR versus PER for two streams of communication within the wireless network using MCS11 and eight training symbols. Curve 312 represents the simulated SNR versus PER for two streams of communication within the wireless network using MCS11 and two training symbols. Curve 314 represents the simulated SNR versus PER for four streams of communication within the wireless network using MCS11 and eight training symbols. Curve 316 represents the simulated SNR versus PER for four streams of communication within the wireless network using MCS11 and four training symbols.

As illustrated in FIG. 3, for most SNR values, the corresponding PER decreases when more training symbols are used regardless of the modulation scheme that is used. For example, as illustrated by curve 306 and curve 308, at the SNR value of roughly 7.5, the PER changes from roughly thirty percent to roughly five percent when eight training symbols (curve 308) are used versus when four training symbols (curve 306) are used for MCS2. As another example, as illustrated by curve 310 and curve 312, at the SNR value of twenty-five, the PER changes from roughly 62 percent to roughly 5.5 percent when eight training symbols (curve 310) are used versus when two training symbols (curve 312) are used for MCS11. As yet another example, as illustrated by curve 314 and curve 316, at the SNR value of thirty, the PER changes from roughly ninety five percent to roughly 60 percent when eight training symbols (curve 314) are used versus when four training symbols are used (curve 316) for MCS11. Therefore, in some implementations, increasing the number of training symbols in the training block may improve performance of the channel estimation. In addition, increasing the number of training symbols in the training block and causing the PER to be reduced may improve the decoding (e.g., a decode rate) of the data portion of the transmission.

According to at least one implementation described in the present disclosure, a 2.5 dB improvement for transmissions using the MCS11 and a 1.2 dB improvement using the MCS2 may be experienced.

Figure 4A:
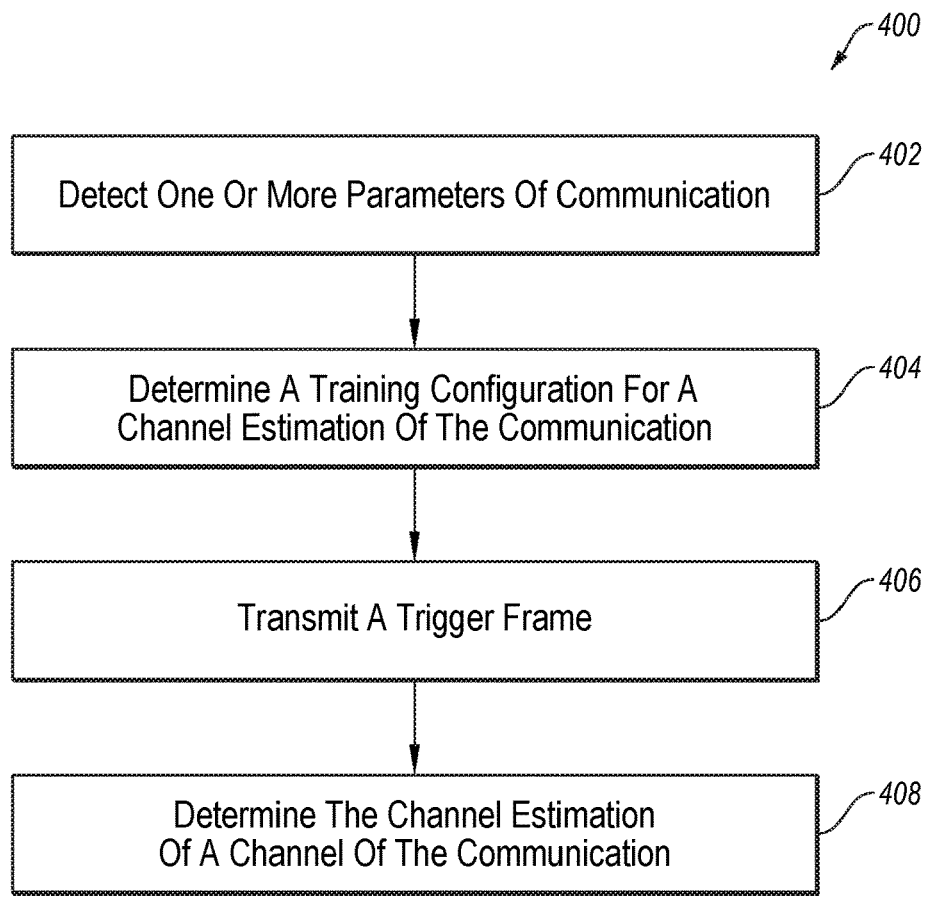
FIG. 4A illustrates a flowchart of an example method to perform channel estimation.

FIG. 4A illustrates a flowchart of an example method 400 to perform channel estimation. In some implementations, the method 400 may be performed by any suitable system, apparatus, or device with respect to determining a channel estimation. For example, the AP 102 or the STA 104 of FIG. 1 may perform or direct performance of one or more of the operations associated with the method 400. The method 400 may include one or more blocks 402, 404, 406, or 408.

At block 402 one or more parameters of communication may be detected. In some implementations, the parameters may be detected for communication between the AP and the STA. In an example, the parameters may be detected specifically for the reverse channel between the AP and the STA. For example, the AP 102 may detect the parameters of communication for reverse channel communication between the AP 102 and the STA 104 of FIG. 1. Block 402 may include, be included in, or correspond to one or more of blocks 202, 204, 206, 208, 210, 212, 214 of FIG. 2.

At block 404, a training configuration for a channel estimation of the communication may be determined. In some implementations, the training configuration may be determined based on the one or more parameters of the communication. For example, the AP 102 of FIG. 1 may determine the training configuration based on the parameters of communication between the AP 102 and the STA 104. Block 404 may include, be included in, or correspond to block 216 of FIG. 2. The training configuration may be determined specifically for subsequent UL transmissions from the STA 104 to the AP 102.

At block 406, a trigger frame may be transmitted from the AP to the STA, e.g., from the AP 102 to the STA 104. The trigger frame may include the training configuration and instructions to the STA 104 to include a training block configured according to the training configuration, e.g., with the adjusted training symbols, in the next UL transmission to the AP 102 of FIG. 1. Block 406 may include, be included in, or correspond to block 224 of FIG. 2.

At block 408, the channel estimation of a channel of the communication may be determined. In some implementations, the channel estimation may be determined using the training block included in the UL transmission. In these and other implementations, the AP 102 of FIG. 1 may determine the channel estimation using the training block.

Figure 4B:
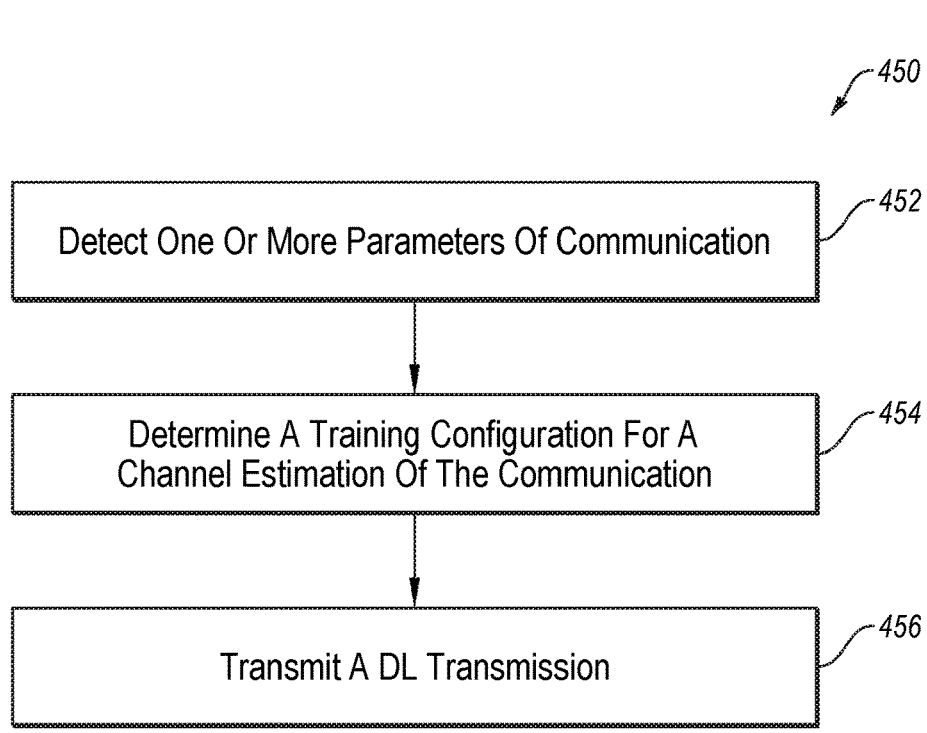
FIG. 4B illustrates a flowchart of another example method to perform channel estimation.

FIG. 4B illustrates a flowchart of another example method 450 to perform channel estimation. In some implementations, the method 450 may be performed by any suitable system, apparatus, or device with respect to determining a channel estimation. For example, the AP 102 or the STA 104 of FIG. 1 may perform or direct performance of one or more of the operations associated with the method 450. The method 450 may include one or more blocks 452, 454, or 456.

At block 452 one or more parameters of communication may be detected. In some implementations, the parameters may be detected for communication between the AP and the STA. In an example, the parameters may be detected specifically for the forward channel between the AP and the STA. For example, the AP 102 may detect the parameters of communication for forward channel communication between the AP 102 and the STA 104 of FIG. 1. Block 452 may include, be included in, or correspond to one or more of blocks 202, 204, 206, 208, 210, 212, 214 of FIG. 2.

At block 454, a training configuration for a channel estimation of the communication may be determined. In some implementations, the training configuration may be determined based on the one or more parameters of the communication. For example, the AP 102 of FIG. 1 may determine the training configuration based on the parameters of communication between the AP 102 and the STA 104. Block 454 may include, be included in, or correspond to block 216 of FIG. 2. The training configuration may be determined specifically for subsequent DL transmissions from the AP 102 to the STA 104.

At block 456, a DL transmission may be transmitted from the AP to the STA, e.g., from the AP 102 to the STA 104. In these and other implementations, the DL transmission may include a training block configured according to the training configuration, e.g., with the adjusted training symbols. Block 456 may include, be included in, or correspond to block 220 of FIG. 2.

The channel estimation of a channel of the communication may then be determined. In particular, the DL transmission may be received at the STA, and the STA may determine the channel estimation of the channel of the communication. In some implementations, the channel estimation may be determined using the training block included in the DL transmission received at the STA. In these and other implementations, the STA 104 of FIG. 1 may determine the channel estimation using the training block.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example, the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1. A method comprising:
detecting one or more parameters of communication between an AP and a STA;
determining a training configuration for a channel estimation of the communication based on the one or more parameters of the communication; and
transmitting a DL transmission to the STA, the DL transmission including a training block configured according to the training configuration,
wherein the STA is configured to determine the channel estimation of a channel of the communication using the training block of the DL transmission received at the STA.

Example 2. A system comprising:
an AP configured to:
detect one or more parameters of communication between the AP and a STA;
determine a training configuration for a channel estimation of the communication based on the one or more parameters of the communication; and
transmit a DL transmission to the STA, the DL transmission including a training block configured according to the training configuration,
wherein the STA is configured to determine the channel estimation of a channel of the communication using the training block of the DL transmission received at the STA.

Example 3. A method comprising:
detecting one or more parameters of communication between an AP and a STA;
determining a training configuration for a channel estimation of the communication based on the one or more parameters of the communication;
transmitting a trigger frame to the STA, the trigger frame including the training configuration and instructions for the STA to include a training block configured according to the training configuration in a UL transmission to the AP; and
determining the channel estimation of a channel of the communication using the training block of the UL transmission received at the AP.

Example 4. A system comprising:
an AP configured to:
detect one or more parameters of communication between the AP and a STA;
determine a training configuration for a channel estimation of the communication based on the one or more parameters of the communication;
transmit a trigger frame to the STA, the trigger frame including the training configuration and instructions for the STA to include a training block configured according to the training configuration in a UL transmission to the AP; and
determine the channel estimation of a channel of the communication using the training block of the UL transmission received at the AP.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    detecting one or more parameters of a channel of communication between an access point (AP) and a wireless station (STA), wherein detecting the one or more parameters of the channel of the communication comprises detecting a signal to noise ratio (SNR) of the channel of the communication;
    determining a training configuration for a channel estimation of the channel of the communication based on the one or more parameters of the channel of the communication, the training configuration indicating at least one of a number of training symbols or a length of training symbols to include in a training block of a downlink (DL) transmission, wherein responsive to the SNR being less than a SNR threshold value, determining the training configuration comprises determining to increase the number of training symbols to be included in the training block of the DL transmission compared to a number of training symbols included in a training block of one or more prior DL transmissions; and
    transmitting the DL transmission to the STA over the channel, the DL transmission including the training block and a data portion, the training block configured according to the training configuration; and
    wherein the STA is configured to determine the channel estimation of the channel of the communication using the training block of the DL transmission received at the STA.

2. The method of claim 1, wherein:
    determining the training configuration comprises determining at least one of the number of training symbols or the length of training symbols to be included in the training block of the DL transmission; and
    the method further comprises generating the training block of the DL transmission according to the training configuration.

3. The method of claim 2, wherein the at least one of the number or the length of the training symbols is determined to reduce airtime overhead of the training block of the DL transmission compared to an airtime overhead of a training block of one or more prior DL transmissions.

4. The method of claim 1, wherein:
    detecting the one or more parameters of the channel of the communication comprises determining the channel of the communication is a flat fading channel; and
    determining the training configuration comprises determining to reduce the length of the training symbols to be included in the training block of the DL transmission compared to a length of one or more training symbols included in a training block of one or more prior DL transmissions.

5. The method of claim 1, wherein:
    detecting the one or more parameters of the channel of the communication comprises detecting a length of one or more packets transmitted between the AP and the STA in one or more prior DL transmissions; and
    responsive to the length of the one or more packets being less than a packet length threshold value, determining the training configuration comprises at least one of:
        determining to reduce the length of training symbols to be included in the training block of the DL transmission compared to a length of training symbols included in a training block of the one or more prior DL transmissions; or
        determining to reduce the number of the training symbols to be included in the training block of the DL transmission compared to a number of the training symbols included in the training block of the one or more prior DL transmissions.

6. The method of claim 1, wherein:
    detecting the one or more parameters of the channel of the communication comprises:
        detecting an airtime of the communication; and
        determining a distance between the AP and the STA based on the airtime of the communication; and
    responsive to the distance between the AP and the STA being greater than a distance threshold value, determining the training configuration comprises determining to increase the number of training symbols to be included in the training block of the DL transmission compared to a number of training symbols included in a training block of one or more prior DL transmissions.

7. The method of claim 1, wherein detecting the one or more parameters of the channel of the communication comprises detecting pre-coding or beamform selection of the channel of the communication.

8. The method of claim 1, wherein:
    detecting the one or more parameters of the channel of the communication comprises detecting a prior training configuration of prior DL transmissions and a success rate of the prior DL transmissions with the prior training configuration, the prior training configuration specifying a prior training symbol length and a prior training symbol number of a prior training block of the prior DL transmissions; and responsive to the success rate being less than a success rate threshold value, determining the training configuration comprises determining to increase at least one of the number or length of training symbols to be included in the training block of the DL transmission compared to the prior training symbol number or the prior training symbol length of the prior training block of the prior DL transmissions.

9. A system comprising:

an access point (AP) configured to:
- detect one or more parameters of a channel of communication between the AP and a wireless station (STA), wherein when detecting the one or more parameters of the channel of the communication, the AP is configured to detect a length of one or more packets transmitted between the AP and the STA in one or more prior DL transmissions;
- determine a training configuration for channel estimation of the channel of the communication based on the one or more parameters of the channel of the communication, the training configuration indicating at least one of a number of training symbols or a length of training symbols to include in a training block of a downlink (DL) transmission, wherein responsive to the length of the one or more packets being less than a packet length threshold value, when determining the training configuration, the AP is configured to perform at least one of:
  - determine to reduce the length of training symbols to be included in the training block of the DL transmission compared to a length of training symbols included in a training block of the one or more prior DL transmissions; or
  - determine to reduce the number of the training symbols to be included in the training block of the DL transmission compared to a number of the training symbols included in the training block of the one or more prior DL transmissions; and
- transmit the DL transmission to the STA over the channel, the DL transmission including the training block and a data portion, the training block configured according to the training configuration,
- wherein the STA is configured to determine the channel estimation of the channel of the communication using the training block of the DL transmission received at the STA.

10. A method comprising:

detecting, by an access point (AP), one or more parameters of a channel of communication between the AP and a wireless station (STA), wherein detecting the one or more parameters of the channel of the communication comprises:
- detecting an airtime of the communication; and
- determining a distance between the AP and the STA based on the airtime of the communication;

determining, by the AP, a training configuration for a channel estimation of the channel of the communication based on the one or more parameters of the channel of the communication, the training configuration indicating at least one of a number of training symbols or a length of training symbols to include in a training block of a downlink (DL) transmission, wherein responsive to the distance between the AP and the STA being greater than a distance threshold value, determining the training configuration comprises determining to increase the number of training symbols to be included in the training block of the UL transmission compared to a number of training symbols included in a training block of one or more prior UL transmissions;

transmitting a trigger frame from the AP to the STA, the trigger frame including the training configuration and instructions for the STA to include the training block configured according to the training configuration in an uplink (UL) transmission to the AP;

receiving, at the AP, the UL transmission from the STA; and determining the channel estimation of the channel of the communication using the training block of the UL transmission received at the AP.

11. The method of claim 10, wherein determining the training configuration comprises determining at least one of the number of training symbols or the length of training symbols to be included in the training block of the UL transmission.

12. The method of claim 11, wherein the at least one of the number or the length of the training symbols is determined to reduce airtime overhead of the training block of the UL transmission compared to an airtime overhead of a training block of one or more prior UL transmissions.

13. The method of claim 10, wherein:
- detecting the one or more parameters of the channel of the communication comprises determining the channel of the communication is a flat fading channel; and
- determining the training configuration comprises determining to reduce the length of the training symbols to be included in the training block of the UL transmission compared to a length of one or more training symbols included in a training block of one or more prior UL transmissions.

14. The method of claim 10, wherein:
- detecting the one or more parameters of the channel of the communication comprises detecting a length of one or more packets transmitted between the AP and the STA in one or more prior UL transmissions; and
- responsive to the length of the one or more packets being less than a packet length threshold value, determining the training configuration comprises:
  - determining to reduce the length of training symbols to be included in the training block of the UL transmission compared to a length of training symbols included in a training block of the one or more prior UL transmissions; or
  - determining to reduce the number of the training symbols to be included in the training block of the UL transmission compared to a number of the training symbols included in the training block of the one or more prior UL transmissions.

15. The method of claim 10, wherein:
- detecting the one or more parameters of the channel of the communication comprises detecting a signal to noise ratio (SNR) of the channel of the communication; and
- responsive to the SNR being less than a SNR threshold value, determining the training configuration comprises determining to increase the number of training symbols to be included in the training block of the UL transmission compared to a number of training symbols included in a training block of one or more prior UL transmissions.

16. The method of claim 10, wherein detecting the one or more parameters of the channel of the communication comprises detecting pre-coding or beamform selection of the channel of the communication.

17. The method of claim 11, wherein:

detecting the one or more parameters of the channel of the communication comprises detecting a prior training configuration of prior UL transmissions and a success rate of the prior UL transmissions with the prior training configuration, the prior training configuration specifying a prior training symbol length and a prior training symbol number of a prior training block of the prior UL transmissions; and responsive to the success rate being less than a success rate threshold value, determining the training configuration comprises determining to increase at least one of the number or length of training symbols to be included in the training block of the UL transmission compared to the prior training symbol number or the prior training symbol length of the prior training block of the prior UL transmissions.

18. A system comprising:

an access point (AP) configured to:

detect one or more parameters of a channel of communication between the AP and a wireless station (STA), wherein when detecting the one or more parameters of the channel of the communication, the AP is configured to:

detect an airtime of the communication; and
    determine a distance between the AP and the STA based on the airtime of the communication;

responsive to the distance between the AP and the STA being greater than a distance threshold value, determine a training configuration for a channel estimation of the channel of the communication based on the one or more parameters of the channel of the communication by determining to increase the number of training symbols to be included in the training block of the UL transmission compared to a number of training symbols included in a training block of one or more prior UL transmissions, the training configuration indicating at least one of a number of training symbols or a length of training symbols to include in a training block of a downlink (DL) transmission;

transmit a trigger frame to the STA, the trigger frame including the training configuration and instructions for the STA to include the training block configured according to the training configuration in an uplink (UL) transmission to the AP; and determine the channel estimation of the channel of the communication using the training block of the UL transmission received at the AP.

\* \* \* \* \*